United States Patent [19]

Turunen et al.

[11] Patent Number: 4,639,514
[45] Date of Patent: Jan. 27, 1987

[54] CYCLIC PROCESS FOR PRODUCING AN ALKALI SOLUTION OF CELLULOSE CARBAMATE AND PRECIPITATING THE CARBAMATE

[75] Inventors: Olli T. Turunen; Jouko Huttenen, both of Porvoo; Johan-Fredrik Selin, Helsinki; Jan Fors; Vidar Eklund, both of Porvoo, all of Finland

[73] Assignee: Neste Oy, Finland

[21] Appl. No.: 779,702

[22] Filed: Sep. 24, 1985

[30] Foreign Application Priority Data

Sep. 27, 1984 [FI] Finland ................................. 843813

[51] Int. Cl.⁴ ............................ C08B 3/00; D01F 2/00
[52] U.S. Cl. ........................................ 536/30; 264/187
[58] Field of Search ........................... 536/30; 264/187

[56] References Cited

U.S. PATENT DOCUMENTS

| | | | |
|---|---|---|---|
| 2,103,639 | 12/1937 | Richter | 264/187 |
| 2,231,927 | 2/1941 | Lilienfeld | 264/187 |
| 2,265,916 | 12/1941 | Lilienfeld | 264/187 |
| 2,283,809 | 5/1942 | Izard | 264/187 |
| 2,371,359 | 3/1945 | Shutt | 264/187 |
| 4,404,369 | 9/1983 | Huttunen et al. | 536/30 |
| 4,456,749 | 6/1984 | Mandell et al. | 536/30 |
| 4,567,255 | 1/1986 | Eklund et al. | 536/30 |

Primary Examiner—Ronald W. Griffin
Attorney, Agent, or Firm—Steinberg & Raskin

[57] ABSTRACT

The present invention concerns a cyclic process for producing an alkali solution of cellulose carbamate, for precipitating the cellulose carbamate from the alkali solution and for recovering and recycling the chemicals. The process comprises the following steps: (a) an alkali solution of cellulose carbamate is prepared by dissolving cellulose carbamate in an aqueous solution of sodium hydroxide, (b) the solution obtained in step (a) is extruded into contact with a precipitating solution containing sodium carbonate, whereby the cellulose carbamate is precipitated and can be separated from the solution, (c) into the solution obtained in step (b) carbon dioxide is conducted for transforming the sodium hydroxide into sodium carbonate, (d) the solution obtained in step (c) is treated with calcium oxide, whereby the sodium carbonate is transformed into sodium hydroxide, and calcium carbonate precipitates from the solution, (e) solution containing sodium hydroxide obtained in step (d) is returned to step (a) for dissolving cellulose carbamate, and (f) calcium carbonate obtained in step (d) is decomposed into carbon dioxide and calcium oxide and the calcium oxide is returned to step (d).

13 Claims, 1 Drawing Figure

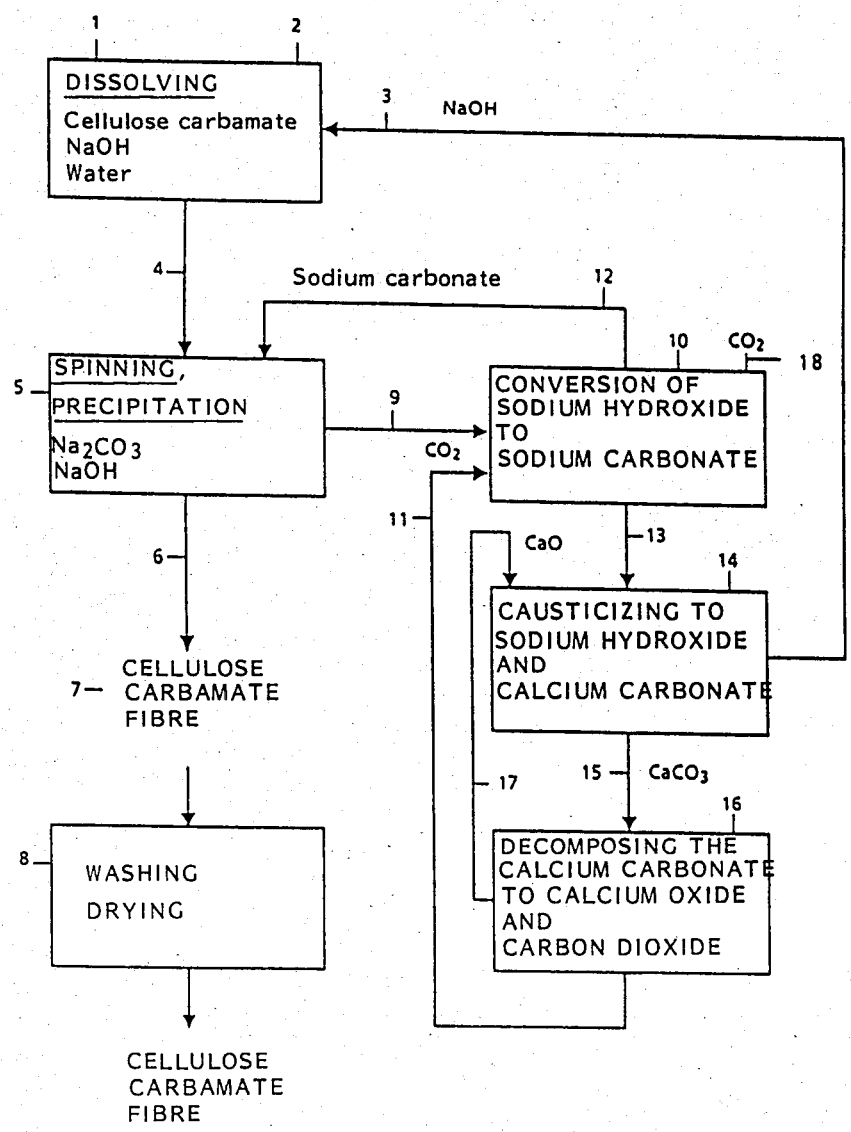

CYCLIC PROCESS FOR PRODUCING AN ALKALI SOLUTION OF CELLULOSE CARBAMATE AND PRECIPITATING THE CARBAMATE

BACKGROUND OF THE INVENTION

The present invention concerns a cyclic process for producing an alkali solution of cellulose carbamate, for precipitating the cellulose carbamate from the alkali solution and for recovering and recycling, in converted form, the chemicals remaining after precipitation.

Cellulose carbamate is an alkali-soluble cellulose derivative which is a reaction product of cellulose and isocyanic acid. It is possible to produce an alkali solution of cellulose carbamate which can be spun into fiber and film by extrusion into a precipitation bath which precipitates the cellulose carbamate from the solution.

For the precipitation bath a solution containing sulphuric acid has usually been used. Cellulose carbamate is stable in acid conditions and it is therefore not decomposed when precipitated. When an alkali solution, e.g., a sodium hydroxide solution of cellulose carbamate is contacted with sulphuric acid, the cellulose carbamate is precipitated and, at the same time, as the sodium hydroxide is neutralized, sodium sulphate is formed. In a continuous process both sulphuric acid and sodium hydroxide is consumed and, at the same time, sodium sulphate is produced. Thus, the precipitation process produces sodium sulphate, which is a drawback since it must be removed from the process and sold as a by-product.

Another, more significant, drawback is that the sodium hydroxide neutralized by sulphuric acid cannot easily be returned to the process. The sodium hydroxide accounts for a significant part of the raw material costs of the process. It would therefore be desirable to develop a precipitation method in which no undesired by-products are produced, particularly a method which does not require use of a mineral acid for neutralization and in which at least a substantial part of the sodium hydroxide could be recovered in an economical way.

At the same time, the method should meet certain requirements as regards the fiber or film quality. For instance, the initial strength of the fiber being precipitated should be sufficient to withstand the mechanical strains to which it is subjected in the treatment. In fiber manufacturing, for instance, stretching the fiber is essential in the spinning step for achieving the desired strength properties.

SUMMARY OF THE INVENTION

The object of the present invention is a cyclic process for dissolving cellulose carbamate, for precipitating the cellulose carbamate from an alkali solution and for reusing the chemicals, some in converted form, in the process. The method of the invention is characterized by the following steps:

(a) an alkali solution of cellulose carbamate is prepared by dissolving cellulose carbamate in an aqueous sodium hydroxide solution;

(b) the solution obtained in step (a) is contacted with a precipitant solution containing sodium carbonate, whereby the cellulose carbamate is precipitated and can be separated from the solution leaving sodium carbonate and sodium hydroxide;

(c) into the solution obtained in step (b) carbon dioxide is conducted for transforming the sodium hydroxide into sodium carbonate;

(d) the solution obtained in step (c) is treated with calcium oxide, whereby the sodium carbonate is transformed into sodium hydroxide and calcium carbonate precipitates from the solution;

(e) the solution containing sodium hydroxide obtained in step (d) is returned to step (a) for dissolving cellulose carbamate; and (f) calcium carbonate obtained in step (d) is decomposed into carbon dioxide and calcium oxide and the calcium oxide is returned to step (d).

With the aid of the present invention a fully cyclic process is achieved, which combines in a single method the production of a cellulose carbamate solution using sodium hydroxide recovered in the process, the precipitation of the cellulose carbamate solution in a precipitant solution containing no mineral acid, the regeneration and reuse of the precipitant solution, and economic recovery of the sodium hydroxide and its return to the dissolving step. In the cyclic process of the invention, there is in principle no need to add or remove chemicals, and this is altogether novel compared with the techniques of the prior art.

BRIEF DESCRIPTION OF THE DRAWING

The single FIGURE in the drawing is a flow or process chart illustrating the steps of the method of the present invention.

DETAILED DESCRIPTION OF THE PREFERRED EMBODIMENTS

The first step in the cyclic process of the invention is the production of an alkali solution of cellulose carbamate. For spinning carbamate fibers, or extruding carbamate film, a spinning (or extruding) solution is prepared by dissolving cellulose carbamate in an aqueous solution of sodium hydroxide. The alkali spinning solution typically contains from about 4 to about 15% by weight of cellulose carbamate dissolved in from about 5 to about 12% by weight of sodium hydroxide. For the dissolution step, sodium hydroxide solution is advantageously used which has been recovered in a manner to be described below in the regeneration of the precipitation bath.

The sodium hydroxide solution of cellulose carbamate produced in the spinning step in the manner described above is extruded in the conventional way through spinnerettes into a precipitating bath, whereby the carbamate is precipitated as a fibrous product. For the precipitating solution, a sodium carbonate solution, preferably an aqueous solution thereof, is used in the method of the invention. The concentration of carbonate in the precipitating bath is from about 10 to about 30% by weight, preferably about 20 to about 25% by weight.

It is essential that in the process of the invention the precipitating solution is substantially free of sulphuric acid or other mineral acids, in contrast to the processes of the prior art.

The spun fiber is separated from the precipitant solution and washed and dried in a manner known in itself in the art.

Together with the solution being spun, sodium hydroxide also enters the precipitant solution. In a continuous process it is necessary to remove an equivalent quantity of sodium hydroxide in order to maintain the concentration thereof at approximately a constant level. Normally, the precipitant solution may contain maximally about 6% by weight sodium hydroxide without causing substantial impairment of the precipitation properties. Similarly, it is necessary to take care that the carbonate content of the precipitant solution is maintained within the desired limits.

The regeneration of the precipitant solution in the cyclic process of the invention comprises a number of reaction steps which in themselves are not new, but which have not before been utilized in manufacturing cellulose derivative fibers or films. The first step is the transformation of the sodium hydroxide entering the precipitant solution together with the solution being spun into sodium carbonate by conducting carbon dioxide into the precipitating bath or into a flow separated therefrom. With the aid of this process step, it is possible to prevent the accumulation of sodium hydroxide in the precipitant solution to undesirable concentration levels. On the other hand, this kind of procedure appears disadvantageous because thereby sodium hydroxide required in the process (in carbamate dissolving) is used up.

As taught by this invention, however, from the carbonate-containing solution obtained in the manner described in the foregoing, sodium hydroxide is prepared in the next step by adding burnt lime (CaO) to the solution. Thereby, calcium carbonate is formed, which precipitates from the solution. The residual mother liquor contains sodium hydroxide and water and can therefore be used as it is in the cellulose carbamate dissolving step. Calcium carbonate may, in a manner known in itself in the art, by heating be reconverted into calcium oxide, releasing carbon dioxide at the same time. The carbon dioxide thus produced may be used in the foregoing manner for transforming sodium hydroxide into sodium carbonate, and the burnt lime is recycled to be causticized to calcium carbonate.

The cyclic method of the invention thus contains features which appear to lead to an opposite result to that which is desired, but which in actual fact, afford unexpected advantages. The reagent required for dissolving cellulose carbamate at the beginning of the process, that is, sodium hydroxide, is temporarily transformed into sodium carbonate and in the next step back to sodium hydroxide. By this method, however, a process is achieved in which no chemicals need be added, only heat energy required for converting the calcium carbonate to calcium oxide. But this drawback is outweighed by the advantages to be gained.

The invention is described in the following with the aid of the process chart reproduced in the attached FIGURE. Cellulose carbamate, indicated by the reference numeral 1 in the FIGURE, is conducted to the dissolving step 2. The cellulose carbamate is dissolved in an aqueous sodium hydroxide solution, which is carried out in a reaction vessel being led to said vessel through a conduit 3. The concentration of the carbamate solution produced in step 2 may be varied, depending on the desired spinning conditions, by varying the quantity of sodium hydroxide conducted to the dissolving step. As a rule, the concentration of the carbamate solution is in the range of from about 4 to about 15% by weight and the sodium hydroxide content in the range of from about 5 to about 12% by weight, typically about 10% by weight. In the dissolving step, agents promoting solubility may be used, if required, but their use is not a necessary feature of the present invention.

The alkali solution of cellulose carbamate obtained in step 2 is conducted through a conduit indicated by reference numeral 4 to a spinning and precipitating step 5, where the solution is extruded, in a manner known in itself in the art, through spinnerettes (not depicted) into a precipitant solution, which causes the cellulose carbamate to precipitate from the solution in fiber form. Alternatively, slit nozzles may be used when manufacturing films. The precipitating fluid in step 5 is an aqueous solution of sodium carbonate. The solution in the spinning and precipitating step 5 also contains sodium hydroxide entering together with the solution being spun. The quantity of sodium hydroxide must not rise to such an amount that it would have a detrimental effect on the precipitation of the cellulose carbamate. It has been found in practice that a maximum of about 5 to about 6% by weight of sodium hydroxide can be allowed in the spinning step 5, but preferably the quantity is maintained at a lower level, not more than about 3% by weight.

The cellulose carbamate fibers produced in the spinning bath 5 can be separated, pretreated, washed and dried in ways known in themselves in the art. These steps, indicated by reference numerals 6–8 are conventional and not essential to the invention, and their detailed description is therefore omitted.

From the spinning and precipitating step 5, solution is withdrawn through a conduit 9, this solution containing, in addition to sodium carbonate, also sodium hydroxide, as has been described above. In step 10, transformation of the sodium hydroxide present in the solution into sodium carbonate is accomplished with the aid of carbon dioxide, which, in steady state operation, is introduced through a conduit 11. Solution containing carbonate obtained in this way is returned through a conduit 12 to the spinning and precipitating step 5 for maintaining the carbonate concentration thereof as desired. If required, it is possible to conduct additional carbon dioxide to step 10, also from an external source, through a conduit 18.

Reference numeral 14 indicates a causticizing step in which sodium carbonate solution withdrawn from step 10 is treated, in a manner known in itself in the art, with calcium oxide entering through a conduit 17, whereby sodium hydroxide and calcium carbonate are produced. The calcium carbonate crystallizes and is separated from the solution, and the crystal mass can be separated by any of the conventional means known in the art. The residual mother liquor containing sodium hydroxide is conducted through the conduit 3 back to the cellulose carbamate dissolving step 2.

Through a conduit 15, the crystallized calcium is conducted to step 16, where it is decomposed by heating into calcium oxide and carbon dioxide. The calcium oxide is conducted through the conduit 17 to the causticizing step 14, and the carbon dioxide is conducted through the conduit 11 to step 10, where the sodium hydroxide is transformed into sodium carbonate.

It is obvious that while practicing the method described hereinabove, various modifications can be accomplished without departing from the scope of the invention.

For instance, the step indicated by reference numeral 10 may be connected to the spinning and precipitating step 5, to which, in that case, carbon dioxide and sodium carbonate solution are conducted and from which solution containing sodium carbonate and sodium hydroxide is removed to go to the causticizing step 14. The chemical equilibria may moreover be maintained by adding or removing water at requisite points, and by making up for any spurious losses of chemicals.

In the following, detailed examples are presented illustrating the application of the process of the invention. These examples are not intended to restrict or limit the scope of the invention in any way.

EXAMPLE 1

An aqueous solution was prepared containing 6.8% by weight cellulose carbamate, 9% by weight sodium hydroxide and 2% sodium carbonate. The solution was spun at 25° C. at the rate of 1.3 kg per hr in an aqueous precipitation bath containing 25% by weight sodium carbonate and 3% by weight sodium hydroxide. By the spinning process, carbamate fibers were produced which had fully satisfactory properties. The fibers were separated from the precipitant solution, washed and dried in conventional manner.

For maintaining constant the composition of the precipitating bath, 0.053 kg carbon dioxide per hr. was conducted into the precipitating bath during the spinning, and 0.68 kg/h water was evaporated.

For regenerating the sodium hydroxide, 0.67 kg/h of the solution was conducted from the precipitation bath to a reactor, to which 0.53 kg/h water was added so that the Na content of the solution was equivalent to 14% $Na_2CO_3$.

The solution was heated to 100° C. and 0.028 kg/h technically burnt lime, calculated as 100%, was added. The mixture was allowed to react at about 100° C. for one hour under agitation, whereby the sodium carbonate conversion increased to 79%. After an additional hour of reaction time, about 81% of the sodium carbonate was converted. Additional reaction time yielded virtually no additional conversion. The calcium carbonate that was formed in the reaction mixture was separated from the solution by centrifuging and washing as a mass containing 60% dry matter.

The clear mother liquor contained 8.7% by weight of sodium hydroxide and 1.5% by weight of sodium carbonate, and it could be used as it was for dissolving a new batch of carbamate.

EXAMPLE 2

An aqueous spinning solution and an aqueous precipitant solution were prepared and the spinning was carried out as in Example 1. In order to regenerate sodium hydroxide from the precipitating bath, 1.3 kg/h of the solution was conducted to a causticizing reactor, in which it was diluted with water, with a view to higher conversion, so that it contained 10% by weight $Na_2CO_3$ and 1.2% NaOH. The solution was heated to about 100° C. and thereto was added lime sludge obtained in earlier causticizing tests, burnt at about 1000° C. In the causticizing process, the sodium carbonate conversion increased to 95% in 15 minutes and to 96% within an hour.

The separated calcium carbonate was filtered off and the clear mother liquor was filtered and inspissated to a concentration of 9% NaOH, whereat it cooled. The solution was cooled further to −5° C., being then appropriate for dissolving cellulose carbamate.

It will thus be seen that there are provided methods which achieve the various objects of the invention and which are well adapted to meet the conditions of practical use.

As various possible embodiments might be made of the above invention, and as various changes might be made in the embodiments above set forth, it is to be understood that all matter herein described is to be interpreted as illustrative and not in a limiting sense.

What is claimed as new and desired to be protected by Letters Patent is set forth in the appended claims.

1. A cyclic method of producing an alkali solution of cellulose carbamate, precipitating the cellulose carbamate in the form of fiber or film from the alkali solution, and recovering and converting the chemicals remaining after precipitation of the cellulose carbonate for reuse in the method comprising the steps of:
   (a) dissolving cellulose carbamate in an aqueous solution of sodium hydroxide, thereby producing an alkali solution of cellulose carbamate;
   (b) extruding said alkali solution into contact with an aqueous precipitating solution containing sodium carbonate, whereby the cellulose carbamate precipitates and can be separated from the resultant solution;
   (c) conducting carbon dioxide into the solution obtained in step (b), thereby converting the sodium hydroxide into sodium carbonate and regenerating the precipitating solution;
   (d) treating the solution obtained in step (c) with calcium oxide, thereby converting the sodium carbonate into sodium hydroxide and causing calcium carbonate to precipitate from the solution;
   (e) recylcing the solution containing sodium hydroxide obtained in step (d) to dissolve cellulose carbamate according to step (a);
   (f) decomposing the calcium carbonate obtained in step (d) into carbon dioxide and calcium oxide;
   (g) recylcing the carbon dioxide obtained in step (f) to convert sodium hydroxide according to step (c); and
   (h) recycling the calcium oxide obtained in step (f) to convert sodium carbonate according to step (d).

2. A method according to claim 1, wherein said precipitating solution is substantially free of mineral acid.

3. A method according to claim 1, wherein said precipitating solution contains from about 10 to about 30% by weight of sodium carbonate.

4. A method according to claim 3, wherein said precipitating solution contains from about 20 to about 25% by weight of sodium carbonate.

5. A method according to claim 1, wherein said precipitating solution contains a maximum of about 6% by weight of sodium hydroxide.

6. A method according to claim 5, wherein said precipitating solution contains a maxium of about 3% by weight of sodium hydroxide.

7. A method according to claim 1, wherein said alkali solution contains from about 4 to about 15% by weight of cellulose carbamate.

8. A method according to claim 1, wherein said alkali solution contains from about 5 to about 12% by weight of sodium hydroxide.

9. A method according to claim 1, wherein said alkali solution is extruded through spinnerettes into the precipitating solution, thereby causing the precipitation of cellulose carbamate in fiber form.

10. A method according to claim 1, wherein said alkali solution is extruded through slit means into the precipitating solution, thereby causing cellulose carbamate to precipitate in film form.

11. A method according to claim 1, wherein the treatment of the solution obtained in step (c) with calcium oxide is carried out at about 100° C.

12. A method according to claim 1, wherein said aqueous solution of sodium hydroxide is cooled to about −5° C. prior to addition of the cellulose carbamate.

13. A cyclic method of producing an alkali solution of cellulose carbamate, precipitating the cellulose carbamate in the form of fiber or film from the alkali solution, and recovering and converting the chemicals remaining after precipitation of the cellulose carbonate for reuse in the method comprising the steps of:

(a) dissolving cellulose carbamate in an aqueous solution of sodium hydroxide, thereby producing an alkali solution of cellulose carbamate;

(b) extruding said alkali solution into contact with an aqueous precipitating solution containing sodium carbonate, whereby the cellulose carbamate precipitates and can be separated from the resultant solution;

(c) conducting carbon dioxide into the solution obtained in step (b), thereby converting the sodium hydroxide into sodium carbonate;

(d) recycling the sodium carbonate obtained in step (c) into the precipitating solution used in step (b);

(e) withdrawing sodium carbonate from the solution obtained in step (b) and treating the same with calcium oxide, thereby converting the sodium carbonate into sodium hydroxide and causing the precipitation of calcium carbonate; and (f) recycling the sodium hydroxide obtained in step (e) to dissolve calcium carbonate according to step (a).

* * * * *